No. 843,339. PATENTED FEB. 5, 1907.
E. J. HOPKINS.
FISH NET STAKE.
APPLICATION FILED JULY 30, 1906.
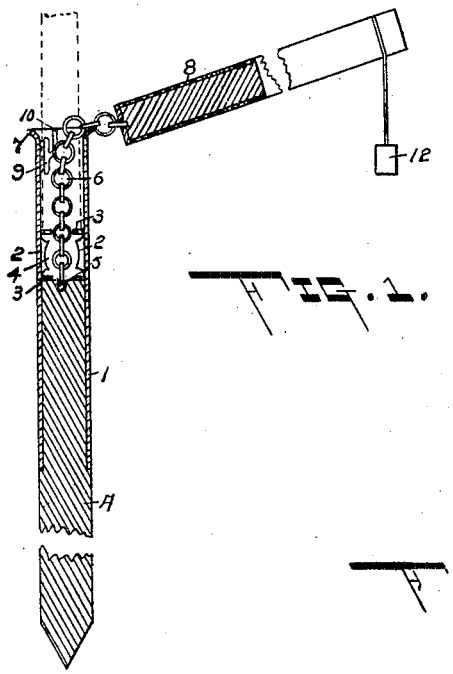
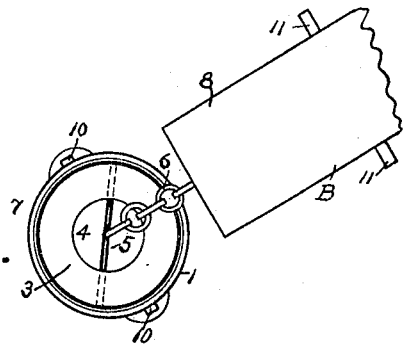
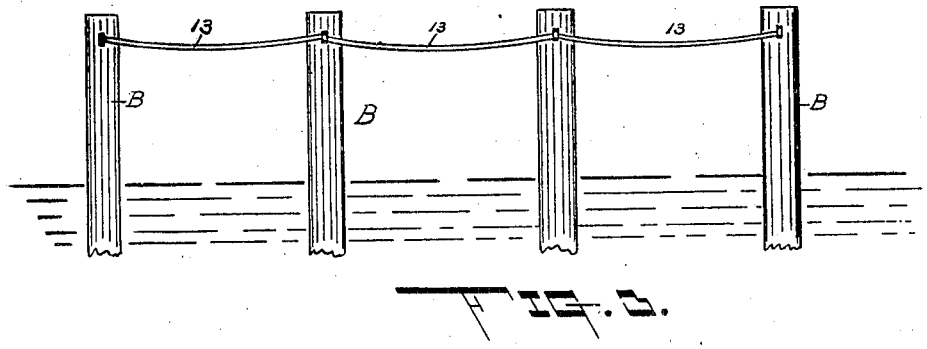
WITNESSES:
Roy Wallis.
Ralph S. Warfield.
INVENTOR
Edward J. Hopkins
BY
Geo. B. Willcox ATTORNEY

UNITED STATES PATENT OFFICE.

EDUARD J. HOPKINS, OF BAY CITY, MICHIGAN, ASSIGNOR OF ONE-HALF TO WILLIAM P. KAVANAUGH, OF BAY CITY, MICHIGAN.

FISH-NET STAKE.

No. 843,339.

Specification of Letters Patent.

Patented Feb. 5, 1907.

Application filed July 30, 1906. Serial No. 328,394.

*To all whom it may concern:*

Be it known that I, EDUARD J. HOPKINS, a citizen of the United States, residing at Bay City, in the county of Bay and State of Michigan, have invented certain new and useful Improvements in Fish-Net Stakes; and I do hereby declare the following to be a full, clear, and exact description of the invention, such as will enable others skilled in the art to which it appertains to make and use the same.

My invention relates to fish-net stakes.

It is well known that the ordinary one-piece stake driven into the bed of a river, stream, or lake is frequently irreparably injured, owing to the formation of ice, and especially when the ice is breaking up and "running out," at which times the heavy cakes by their impact against the stakes at or about the water-line quickly chafe, wear out, and break the stakes, causing considerable expense and labor in replacing the broken stakes with new ones.

One object of my invention is to provide a stake which can be so manipulated at the end of the fishing season as to avoid its contact with the ice. This advantage has been hitherto remarked, and some attempt has been made to avoid the same; but such constructions as I am familiar with either depend upon the entire removal of the upper part of the stake, thereby entailing considerable labor in removing the upper sections, but also in relocating the lower sections at the beginning of the fishing season, or by fixedly hinging the upper and lower sections together. This latter method is hardly practicable, however, owing to the fact that the current or the tide would bring considerable force to bear against the upper hinged portion and would probably strain the hinge, so that it would break off or become inoperative.

Another object, therefore, of my invention is to provide a stake the sections of which are positively connected with each other in such a manner that the upper section can be removed from the lower section, yet still be connected thereto.

A further object is the provision of a connection which will permit the upper sections to swing with the tide or current relative to the lower sections. It may frequently happen also that a light stake before becoming water logged or soaked would tend to float; and it is still a further object of my invention to provide means for releasably locking the sections of the stake together during the fishing season.

In former constructions the lower sections of the stakes had to be separately located; but it is another object of my invention to provide means whereby the location of the first stake results in the positive location of the remaining stakes.

To these and other ends, therefore, my invention consists in certain novel features and combinations of parts, together with their equivalents, such as will be more fully described hereinafter and particularly pointed out in the claims.

In the accompanying drawings, Figure 1 is a longitudinal sectional view of a two-part stake, portions being shown in full lines, dotted lines showing the normal position of the sections during the fishing season. Fig. 2 is a detail view showing the female portion of the releasable lock for retaining the sections in alinement in upright position, and Fig. 3 is a view in side elevation of a series of stakes so connected that the location of any one will result in the location of all.

In the particular embodiment of my invention herein illustrated, A indicates the lower section of a two-part stake preferably pointed at its lower end and adapted to be driven into the bed of the waterway. Affixed to the upper end of the lower section of the stake is a preferably, though not necessarily, cylindrical socket 1, the exterior periphery of which is flush with the exterior periphery of the lower section to provide a smooth surface, whereby to obviate any accidental entangling of the net therewith. The ferrule is secured fixedly to the lower section in any suitable manner and has sufficient bearing on the lower section so that it will remain firmly in place in spite of any strain brought to bear thereupon. The socket projects some distance above the upper end of the lower section and is adapted to receive the lower end of the upper section B of the stake, said upper section having the net (not shown) attached thereto in any suitable manner.

Located within the socket intermediate its ends are a series of longitudinally-extending strengthening-ribs 2 2, above and below the ends of which are located the collars 3 3, the lower one of which engages the extreme upper end of the lower section and forms a seat against which the upper end of the lower section abuts, a chamber 4, surrounded by the ribs 2 2, being left between the collars 3 3.

The socket may be secured to the upper section either before or after it has been driven into place in the bed of the waterway; but preferably before and prior to placing the socket on the lower section a cross-bar 5, to which one end of a chain 6 is connected, is dropped through the upper end of the socket and through the apertures in the collars 3 3 until it lies beneath the lower collar 3 and transversely of the socket, the length of the cross-bar 5 being greater than the diameter of the aperture through the lower collar 3, the cross-bar being embedded in the upper end of the lower section A of the stake, or a transverse recess may be provided to receive such bar. It is of course obvious that I might seat the bar transversely of the socket, below or above the lower collar, as well.

The upper end of the socket is flared outward, as at 7, to facilitate the placing of the lower end of the upper section of the stake in position, the opposite end of the chain or other flexible connection 6 being secured to the extreme end of the upper section B of the stake, the chain being preferably of such length as to permit the upper section to be raised just clear of the flared end of the socket, as shown. When the upper section is inserted in the socket, the slack chain is received in the chamber 4 between the collars, the lower end of the upper section seating upon the upper collar 3. The chain is provided with a swivel or equivalent device to prevent its snarling. The lower end of the upper section is shod with a ferrule 8 of metal, as is the socket, the ferrule being of less diameter than the diameter of the socket to permit the exit of water in the socket when the upper section is inserted therein and also to prevent the upper section from sticking or rusting in the socket. The peripheries of the ferrule and upper section are similar, so that a smooth unbroken surface is formed.

From the foregoing it is obvious that I have devised a two-part stake the sections of which are permanently yet loosely connected with each other, so that the upper section may be erected or taken down at pleasure. It is of course understood that the upper end of the socket lies beneath the surface-level of the water a considerable distance, so as not to be injured by the formation or breaking up of ice, such distance being determined by the thickness of the ice forming at the place of use.

Heretofore stakes have been constructed wherein the upper section was locked to the lower section, and much trouble and labor was necessary to unlock the upper section, which then had to be stored during the winter, and entailed a considerable expenditure of time when relocating the lower section. I am also aware of a two-part stake the upper section of which was equipped with a depending socket receivable over the lower stationary section; but in both these constructions the upper section was entirely removed from the lower section at the close of the fishing season.

As before stated, until the upper section becomes water-logged it may have a tendency to float despite the metallic ferrule with which it is equipped, to prevent which I preferably thicken, if necessary, the socket at two diametrically opposite points and form a groove therein, such as shown in detail in Fig. 2, the groove comprising an approximately vertical recess 9, with which communicates a curved or J-shaped recess 10, the upper end of which extends to a point at or near the upper end of the flared socket 7. I also equip the ferrule 8 with diametrically oppositely extending studs 11 11, the ends of which are receivable in recesses 10 10 and are led thereby into the recess 9, the latter being made deep enough so that the extreme end of the ferrule will engage and rest upon the upper collar 3 before the studs 11 11 can seat against the bottoms of the recesses 9 9. This is done in order to prevent breaking off the studs—as when the upper section is used to drive the lower section into the bed of the waterway, for instance. Thus when placing the upper section after its lower end has been inserted in the socket the studs are caused to enter the curved grooves 10 10, and as the upper section is forced downward a slight turn will cause the studs to follow the grooves 10 until they enter the grooves 9, whereupon the upper section is locked against accidental disconnection from the socket. In removing the upper sections a slight turn in the reverse direction is all that is necessary to disengage the studs from the vertical grooves 9 9, after which the upper section may be lifted out of the socket.

It is plain that if no means were provided whereby the location of one stake would positively lead to the location of all the remaining stakes great trouble and annoyance would be occasioned at the beginning of each fishing season, as the upper sections at the close of the fishing season are lifted out of the sockets and allowed to float submerged in the water, a weight 12 being removably secured at or near the upper end of the upper section, whereby the sections are sunk to a point beneath the lower surface of the ice which may form.

In order to reduce the labor of relocating each of the stakes at the commencement of the fishing season, I preferably connect the upper sections of all stakes by means of a light cable, chain, or other flexible connection 13, whereby the location of one stake will positively result in the location of all the remaining stakes.

From the foregoing it is obvious that I have devised a most convenient invention, which not only possesses all the advantages of prior constructions along this line, but also avoids the disadvantages incident to such prior constructions, and, furthermore, possesses features of utility never before to my knowledge made public.

Stakes constructed in accordance with my invention are simple, inexpensive, and much more durable as well as much less liable to injury than former constructions.

It is evident that many changes might be made in the form and arrangement of the several parts described without departing from the spirit and scope of my invention, and hence I do not wish to limit myself to the exact construction herein set forth.

Having thus fully described my invention, what I claim as new is—

1. A fish-net stake comprising a lower section, an upper section removable relative to the lower section, means for retaining the upper and lower sections in alinement and a loose connection between the upper and lower sections.

2. A fish-net stake comprising a stationary lower section, an upper section adapted to be alined with the lower section and to move vertically relative thereto, and a flexible connection between the sections.

3. A fish-net stake comprising a lower section, a socket carried thereby and an upper section, the lower end of which is removably stepped in the socket, the upper section movable vertically relative to the lower section and a positive connection between the upper and the lower sections to prevent their separation.

4. A fish-net stake comprising a lower section, a socket mounted thereon, the periphery of the socket being flush with the periphery of said lower section, an upper section removably seated in the socket and a positive connection between the upper and the lower sections to prevent their entire separation.

5. A plurality of fish-net stakes, each comprising a lower section, a socket carried thereby, an upper section removably seated in the socket, the upper section capable of vertical movement relative to the lower section, means for connecting the upper sections of the stakes, and means positively connecting each upper section with its corresponding lower section to prevent entire separation.

6. A fish-net stake comprising a lower section, a socket carried thereby and outwardly flared at its open end, an upper section removably seated in the socket and means for positively connecting the upper and lower sections to prevent their entire separation.

7. A fish-net stake comprising a lower section, a socket carried thereby, a seat formed in the socket above the upper end of the lower section whereby to leave a chamber between the seat and upper end of the lower section, an upper section, one end of which is removably received in the socket and a flexible connection between the upper and lower sections, the connection received in the chamber when the upper section is received in the socket.

8. A fish-net stake comprising a lower section, a socket carried thereby, a pair of collars located interiorly of the socket and spaced apart from each other, the upper collar being apertured, the lower collar forming a seat for the upper end of the lower section, an upper section removably seated upon the upper collar and a flexible connection between the upper and lower sections and passing through the aperture in the upper collar, the connection received in the space between the collars when the upper section is seated in the socket.

9. A fish-net stake comprising a lower section, a socket carried thereby, a pair of collars located interiorly of the socket and spaced apart from each other, the upper collar being apertured, the lower collar forming a seat for the upper end of the lower section, an upper section removably seated upon the upper collar, strengthening-ribs located interiorly of the socket between the collars, and a flexible connection between the upper and lower sections and passing through the aperture in the upper collar, the connection received in the space between the collars when the upper section is seated in the socket.

10. A fish-net stake comprising a lower section, a socket carried thereby, an apertured seat formed in the socket and spaced above the upper end of the lower section, a pin held in the socket beneath the seat, an upper section removably receivable in the socket and a flexible connection between the upper section and the pin.

11. A fish-net stake comprising a lower section, a socket carried thereby, the socket provided with intersecting bayonet-grooves, an upper section removably seated in the socket and studs carried by the upper section, the studs received and traveling in the grooves.

12. A fish-net stake comprising a lower section, a socket carried thereby, an upper section removably seated in the socket, studs carried by the upper section, the socket provided with intersecting grooves adapted to receive the studs to releasably lock the upper and lower sections together, one of the intersecting grooves being of such length that the upper section is seated before the stud reaches the bottom of the groove.

13. A fish-net stake comprising a lower section, an upper section removably seated relative thereto, and means for connecting the upper and lower sections at all times to prevent an entire separation thereof, the upper section capable of a vertical movement relative to the lower section.

14. A fish-net stake comprising a lower section, an upper section removably supported thereby, and means for flexibly connecting the sections to permit the unseating of the upper section relative to the lower section and to permit the upper section to swing horizontally relative to the lower section.

15. A fish-net stake comprising a lower section, an upper section removably seated thereon, means for preventing an entire separation of the sections and a weight for submerging the upper section subsequent to its unseating.

16. A fish-net stake comprising a fixed lower section, a socket carried thereby, an upper section loosely and removably received in the socket and a flexible connection, the opposite ends of which are respectively connected to the upper and lower sections.

In testimony whereof I affix my signature in presence of two witnesses.

EDUARD J. HOPKINS.

Witnesses:
  EUGENE FIFIELD,
  W. A. PENNEY.